March 2, 1926.  
G. H. ROSSEBO ET AL  
POPCORN MACHINE  
Filed Feb. 21, 1925  
1,575,005  
2 Sheets-Sheet 1
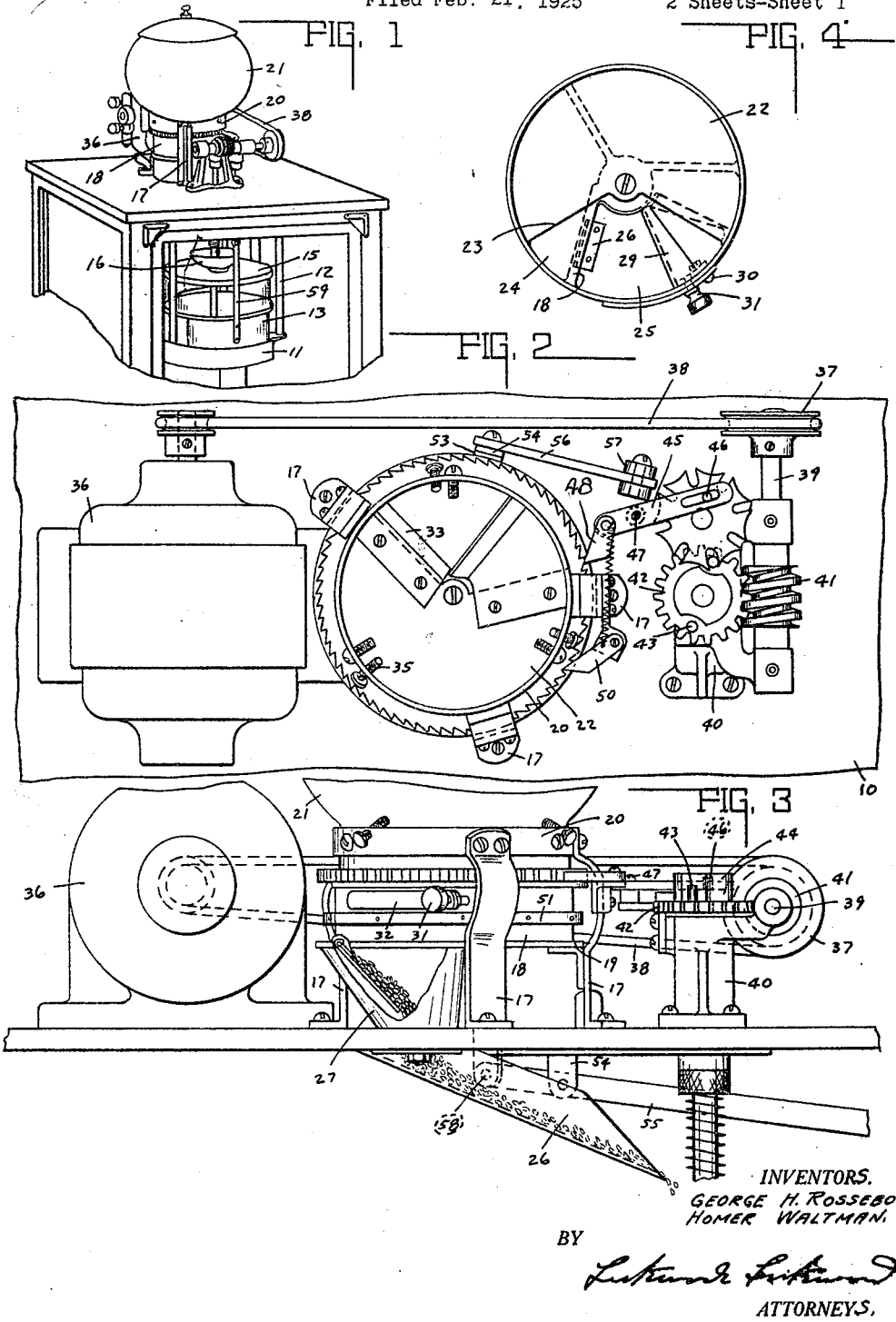
INVENTORS.  
GEORGE H. ROSSEBO  
HOMER WALTMAN  
BY  
ATTORNEYS.

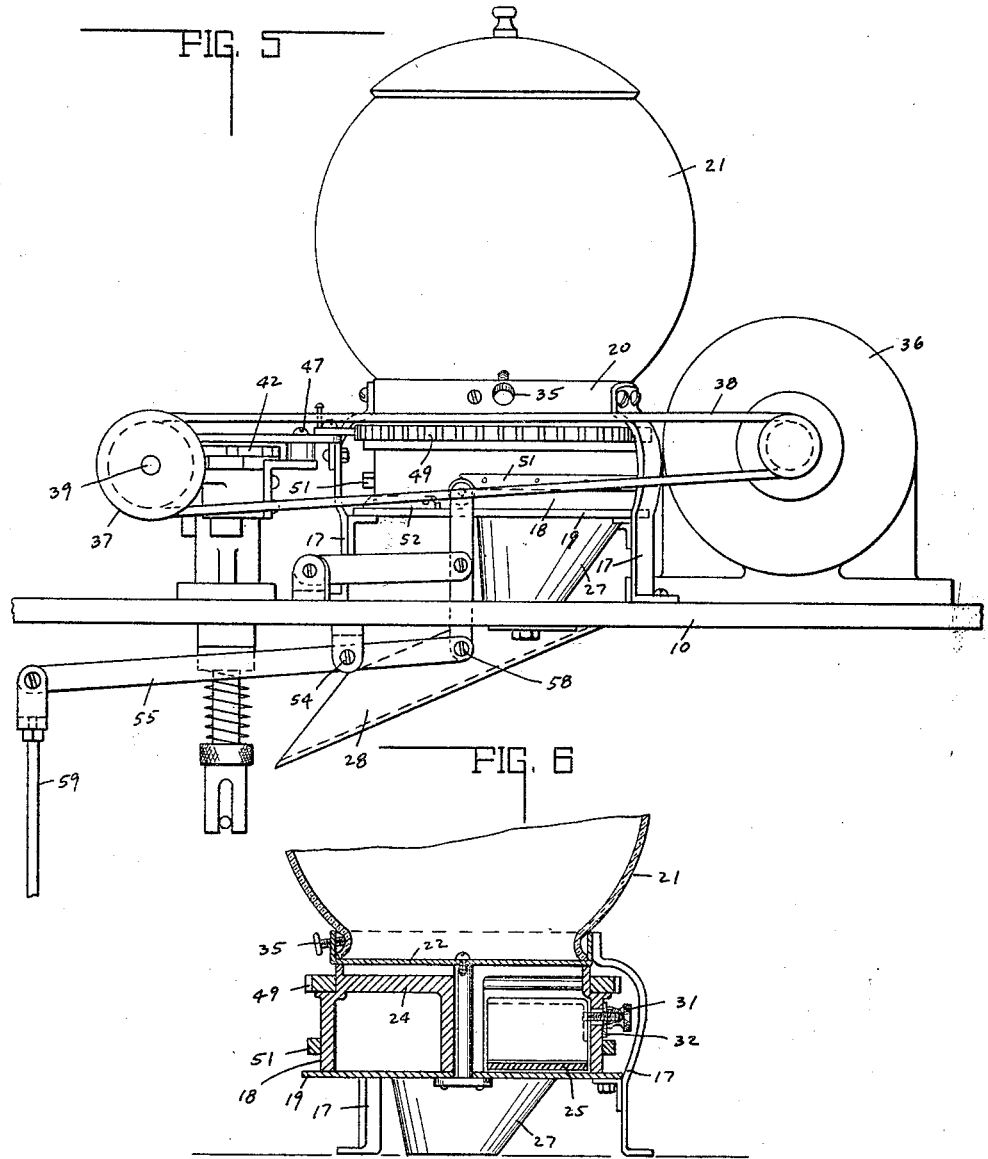

Patented Mar. 2, 1926.

1,575,005

UNITED STATES PATENT OFFICE.

GEORGE H. ROSSEBO AND HOMER WALTMAN, OF INDIANAPOLIS, INDIANA, ASSIGNORS TO HOLCOMB AND HOKE MANUFACTURING COMPANY, OF INDIANAPOLIS, INDIANA, A CORPORATION.

POP-CORN MACHINE.

Application filed February 21, 1925. Serial No. 10,888.

*To all whom it may concern:*

Be it known that we, GEORGE H. ROSSEBO and HOMER WALTMAN, citizens of the United States, and residents of Indianapolis, county of Marion, and State of Indiana, have invented a certain new and useful Pop-Corn Machine; and we do hereby declare that the following is a full, clear, and exact description thereof, reference being had to the accompanying drawings, in which like numerals refer to like parts.

This invention pertains to a popcorn machine, and particularly to the mechanism for controlling the corn hopper and dispensing at timed intervals the proper charge of corn onto the hot plate, such discharging intervals coinciding with the discharge of the popcorn therefrom.

The principal object of the invention resides in the relatively simple actuating mechanism and the associated cams and levers for controlling and timing the discharge of grain onto the hopper plate, with respect to the discharge of the popcorn therefrom, whereby such mechanism is greatly simplified and cheapened over the more elaborate mechanisms heretofore employed for like purposes.

Other features of the invention will be hereafter more fully set forth and described.

The full nature of the invention will be understood from the accompanying drawings and the following description and claims:

In the drawings, Figure 1 is a perspective view of a top portion of the popcorn machine showing the hopper dispensing mechanism and hot plate in perspective. Fig. 2 is a plan view of the hopper dispensing mechanism, the globular container being removed. Fig. 3 is a side elevation of the dispensing mechanism. Fig. 4 is a plan view of the measuring hopper and means for adjusting the same. Fig. 5 is a side elevation showing the opposite side of the machine to that shown in Fig. 3. Fig. 6 is a section taken on a line 6—6 of Fig. 2.

In the drawings there is shown a popcorn machine cabinet 10 having the usual transparent panels through which the corn-popping devices are visible. Suspended from the top of the cabinet there is a popping plate 11, the same being suspended by the rods 12. The popping plate is surrounded by an annular retaining wall 13 and is provided with a top plate 14 between which there is positioned a transparent corn and heat retaining wall 15 for permitting observation of the popcorn during the popping process. Mounted on top of the plate 14 there is a funnel-like member 16 communicating with the interior of the device for receiving a charge of the corn from the dispensing mechanism.

Mounted on top of the cabinet and supported thereon by the legs 17 there is an annular measuring and dispensing member 18 rotatably supported between the plate 19 and the ring or band 20 which are supported by said legs 17 in spaced relation to the top of the cabinet. Mounted on said ring and detachably secured thereto there is a globular corn hopper 21 for containing the supply of corn to be popped.

The ring 20 is formed with an integral bottom plate 22 which supports the corn contained in the hopper and forms the bottom thereof, said plate or bottom 22 being provided with a V-shaped opening 23 for permitting a charge of corn to pass therethrough. The dispensing member 18 is rotatable with respect to said bottom plate 22 and ring 20 and is provided with a top plate 24 which lies adjacent the plate 22.

Said dispensing member is provided with a pocket for receiving the charge of corn when it registers with the opening 22 in plate 22 during the rotation of said member with respect to the hopper. The pocket has a trap door 25 which is hinged to one of the ribs of said member by the hinge 26, whereby said trap door 25 will remain closed and support the charge of corn by reason of its resting upon the plate 19 until the rotation of said member causes it to drop through an opening in said plate immediately above the discharge spout 27. Said spout is fixedly mounted to the plate 19 and registers with an opening in the top of the cabinet 10 communicating with the discharge chute 28. The discharge chute 28 is positioned immediately above the funnel-like member 16 so that the charge passes therethrough into said funnel and onto the hot plate.

It will, therefore, be observed that upon the rotation of the dispensing member 18 between the bottom plate 22 of the hopper and the plate 19, the pocket or measuring chamber formed therein will be filled with corn upon its registering with the opening 23 in said hopper bottom plate 22. This pocket full of corn will be carried by said member during its continued rotation until the trap door 25 in the bottom thereof drops down through the opening in the plate 19 registering with the spout 27. The measured charge of corn will accordingly pass by gravity through the chute 28 onto the popping plate. After the corn has thus been discharged from said member its continued rotation will cause the trap door 25 to engage the edge of the opening in the plate 19, whereby it will be closed. A charge of corn of the volume determined by the size of the pocket will accordingly be discharged onto the popping plate during each revolution of said member.

In order that the charge of corn may be varied in quantity, the dispensing member is provided with a sliding partition 29 mounted in said member and forming one wall of the pocket, said partition being provided with the guide screw 30 and the adjusting screw 31 extending through a suitable slot in the wall of said member and provided with a closing strip 32 for closing said slot and preventing corn from falling therethrough. By means of the sliding partition the pocket 25 may be readily varied in capacity for holding a given quantity of corn. Detachably secured to the hopper bottom plate 22 there are spring metal wiper plates 33 and 34 for preventing the corn resting on the top plate 24 of the dispensing member from becoming wedged between said top plate and the plate 22, the edges of the wiper plates 33 and 34 yieldingly engaging with said top plate 24 of the dispensing member. The screws 35 are provided about the ring 20 for removably securing the hopper 21 in position thereof.

The actuating mechanism comprises the motor 36 supported on the top of the casing 10 and positioned to drive the pulley 37 through the belt 38. The pulley 37 is mounted on a shaft 39 supported on a bearing bracket 40 and has keyed thereto the worm gear 41. Said worm gear is adapted to mesh with and drive the gear 42, which gear is provided with the pins 43 adapted to engage and rotate the star wheel 44. Both said gear and star wheel are horizontally and rotatably mounted on the bearing support 40, and the pins 45 are so positioned that the star wheel will receive one movement on every half revolution of the gear.

The star wheel is adapted to actuate the link 45 through means of the pin and slot connection 46, said link being pivoted on the casing at 47 and having pivotally mounted on the end thereof the pawl 48. Said pawl is positioned to engage with the ratchet teeth 49 secured to and completely surrounding the dispensing member 18. A locking pawl 50 is positioned in engagement with said ratchet teeth so as to hold the same against movement during the return movement of the pawl 48 to re-engagement with a new tooth. It will be observed, therefore, that the motor will cause the rotation of the gear 42, which in turn will rotate the star wheel which through the medium of the pawl 48 will rotate the dispensing member.

It will be observed also that it will take four revolutions of the gear 42 to cause one revolution of the star wheel and cause the dispensing member to be rotated to the extent of one tooth, whereby said member receives a very slow rotary movement.

Surrounding the periphery of the dispensing member there are provided the cam members 41 and 52, the cam member 51 extending about the entire periphery thereof with the exception of a short distance through which the cam 52 extends. The cam 51 is spaced from the plate 19 so that the roller 53 may pass therebetween until the rotation of said dispensing member and cams cause it to engage the cam member 52, whereby it will be raised above its normal position during its passage over the cam member 52 until it engages the end of the member 51 which forces it down into normal position. Thus the roller 53 during each revolution of the dispensing member is raised during a portion of its movement.

Said roller is mounted on the link 54 which extends downwardly through the top of the casing and has its lower end pivotally connected to the lever 55. The guide link 56 is also pivoted to the link 54 and to the bearing 57 secured to the top of the casing. One end of the lever 55 is pivotally connected to a depending ear 58, the other end of which is pivotally connected to the downwardly extending rod 59 which in turn is connected with a vertically movable gate in the band or housing 13.

Upon each rotation of the dispensing member the lever 55 will be actuated through the roller and cam, which will cause the rod 59 to open and close at timed intervals the popcorn discharge opening for permitting the popcorn to be discharged from the hot plate. It will further be noted immediately upon a closing of the discharge opening from the hot plate, the trap door 25 in the dispensing member will drop down and cause a new charge of corn to be dispensed. During the following revolution of the dispensing member a new charge of corn will be popped and a new measured charge of unpopped corn will be received by the pocket in the dispensing member. When the revolution is nearly completed the rod 59 will be lifted to permit the discharge of the popped corn, and thereafter closed, and the new charge permitted to pass onto the hot plate.

The invention claimed is:

1. In a popcorn machine having a casing and a corn hopper supported thereon, a rotatable dispensing member associated with said hopper, ratchet teeth positioned about the periphery of said member, a pawl positioned to engage said ratchet teeth for causing the rotation of said member, a star wheel operably connected with said pawl, a gear having pins thereon for engaging the said star wheel and causing the rotation thereof, and means for driving said gear, whereby said member will receive a timed and relatively slow rotary movement through said star wheel.

2. In a popcorn machine, the combination with a rotary dispensing member, of means for imparting a timed and relatively slow movement to said member comprising a train of ratchet teeth secured about the periphery thereof, a lever fulcrumed on said machine and having a pawl pivoted to one end thereof in position to engage said teeth, a star wheel rotatably mounted on said machine having a pin and slot engagement with said lever, a gear wheel adapted to impart a periodical rotary movement to said star wheel, and means on said machine for rotating said gear.

3. In a popcorn machine, the combination with a rotary dispensing member, of means for imparting a timed and relatively slow movement to said member comprising a train of ratchet teeth secured about the periphery thereof, a lever fulcrumed on said machine and having a pawl pivoted to one end thereof in position to engage said teeth, a star wheel rotatably mounted on said machine having a pin and slot engagement with said lever, a gear wheel adapted to impart a periodically rotary movement to said star wheel, a worm gear supported on said machine adapted to mesh with and rotate said gear, and means for causing the rotation of said worm gear.

4. In a popcorn machine having a hot plate and a closure therefor, a rotary dispensing member for delivering a charge of corn to said hot plate, means for rotating said member and rotatable therewith, a cam mounted on said member, and means connected with said hot plate closure and actuated by said cam for opening and closing said closure at timed intervals rotation of said dispensing member.

5. In a popcorn machine having a hot plate and a closure therefor, a rotary dispensing member for delivering a charge of corn to said hot plate, means for rotating said member, a cam mounted on said member, a rod connected to said closure, a lever having one end pivoted to said rod and the other end to said machine, and a link actuated by said cam for raising and lowering said rod, whereby said closure would be actuated at timed intervals during the rotation of said member.

In testimony whereof, we have hereunto affixed our signatures.

GEORGE H. ROSSEBO.
HOMER WALTMAN.